Sept. 22, 1970   J. J. DE HAYE   3,529,425
PRESSURE CONTROL SYSTEM FOR SOLID PROPELLANT ROCKET MOTORS
Filed Sept. 16, 1968   2 Sheets-Sheet 1

John J. DeHaye INVENTOR.

BY [signature]

ATTORNEY

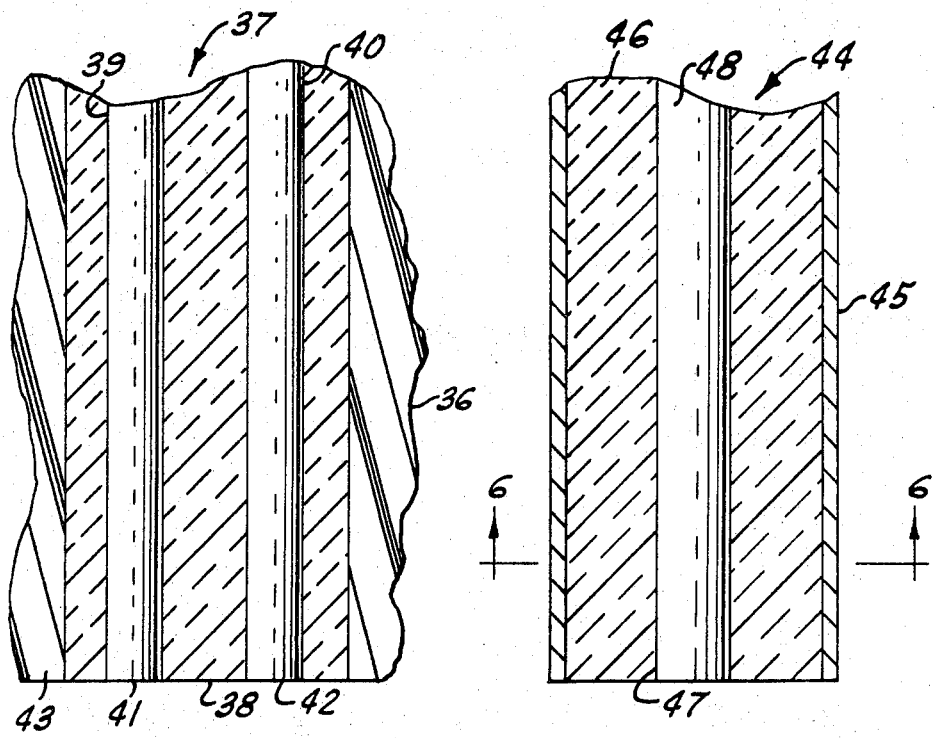
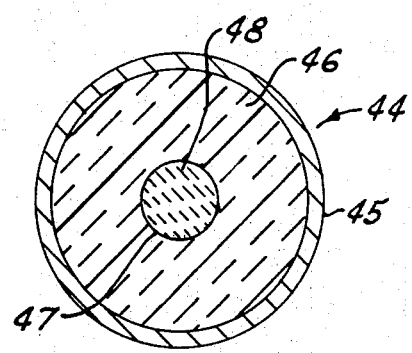
John J. DeHaye INVENTOR.
ATTORNEY

United States Patent Office 3,529,425
Patented Sept. 22, 1970

3,529,425
PRESSURE CONTROL SYSTEM FOR SOLID PROPELLANT ROCKET MOTORS
John J. De Haye, Huntsville, Ala., assignor to Thiokol Chemical Corporation, Bristol, Pa., a corporation of Delaware
Filed Sept. 16, 1968, Ser. No. 759,881
Int. Cl. F02k 9/04
U.S. Cl. 60—254                             9 Claims

ABSTRACT OF THE DISCLOSURE

The use of electric resistance heated or arc consumed conductors that are embedded in a solid propellant grain in a solid propellant rocket motor perpendicular to the burning surface of the solid propellant grain and having an electrical power source and a control source connected thereto to provide variable pressure ratios in the solid propellant rocket motor.

BACKGROUND OF THE INVENTION

Field of the invention

It is a well-known fact that the solid propellant rocket motors and gas generator systems that are in use at the present time are limited in operational requirements, because of the lack of available versatile command control systems that are capable of producing variable pressure ratios.

The instant invention was submitted, therefore, to provide a versatile command-control system for the pressure regulation of solid propellant rocket motors by the utilization of electric resistance heated or arc consumed conductors that are embedded in the solid propellant grain and control pressure in the solid propellant rocket motor by altering the burning surface area of the solid propellant grain through the local stimulation of the burning rate of the solid propellant grain.

Description of the prior art

The present method that is utilized to achieve pressure variations in solid propellant rocket motors is by means of variations in the design of the configuration that is provided for the solid propellant grain. This method, however, has the disadvantage of being a fixed, complicated system of limited pressure profile and ratio. Other means of achieving pressure variations include pintle nozzles or gas valves which are also complicated and often offer only limited pressure ratios. The instant invention, however, does not rely on the design of the propellant configuration or complicated nozzles or valving and thus, can be used in many different types of solid propellant rocket motors.

SUMMARY OF THE INVENTION

This invention, therefore, relates to pressure control systems for solid propellant rocket motors that, by the use of an electrical power source, furnish energy to resistance heated or arc consumed conductors that are embedded in a solid propellant grain that is in a solid propellant rocket motor.

The pressure control system embodying the invention, therefore, utilizes electric resistance heated or arc consumed conductors that are embedded in a solid propellant grain in a solid propellant rocket motor perpendicular to the burning surface of the solid propellant grain and extending longitudinally thereof and having an electrical power source and a control source connected thereto, whereby energy supplied to the conductors by the electrical power source will effect the burning surface area of the solid propellant grain.

The instant invention, therefore, utilizes two methods of pressure control, one by the use of conductors that are resistance heated by an electric current and the second by the use of conductors that are consumed by an electric arc.

The burning rate of the solid propellant grain that is in contact with the resistance heated conductor is increased above the base burning rate of the solid propellant grain by the elevated temperature in the contact area, thus a conical depression forms in the solid propellant grain in that area about the resistance heated conductor as the solid propellant grain heated thereby is consumed. It will be apparent, therefore, that the burning surface of the solid propellant grain and the pressure within the solid propellant rocket motor are a function of the depth of the conical depressions created and the number of the conductors that are used. The depth of the conical depressions being determined by the motor pressure that is controlled by the heat generated by the conductors. It is to be understood, however, that the maximum temperature to which the conductors should be heated should be below the ignition temperature of the solid propellant grain in which the conductors are embedded and the formulation of the solid propellant grain is tailored to meet this requirement. Thus, pressure changes can be controlled so that many variations in such pressures can be achieved.

If, for instance, a solid propellant rocket motor requires one or more fixed high pressure periods of known duration as, for example, a solid propellant rocket motor that has boost-sustain capability resistance heated conductors that are capable of providing a constant high temperature profile and such conductors may be of predetermined lengths with the heated area extending over a given length to carry out certain capabilities that are necessary for the solid propellant rocket motor to meet certain operational flight requirements.

When electrical current is supplied to the conductor, the burning surface area of the solid propellant grain will be increased, as well as the pressure and thrust of the solid propellant rocket motor. Thus, the high pressure operation that results from the flow of the electric current will continue until the burning surface of the solid propellant grain recedes beyond the heated portion of the conductor.

In carrying out the invention, solid propellant rocket motors requiring several pressure cycles may use a conductor that will provide a localized heating zone at or near the burning surface of the solid propellant grain with a decreasing temperature profile so that the highest temperature will be near the burning surface of the solid propellant grain. The temperature of the localized heating zone may be higher than the ignition temperature of the solid propellant grain in contrast to the requirement for the conductor with the constant high temperature profile as described above. The conductor can be so constructed that it will burn off as the surface of the solid propellant grain recedes, also the burning surface area of the solid propellant grain and the pressure of the solid propellant rocket motor may be increased by applying an electrical current to the conductor and the temperature of the conductor will depend on the amplitude of the applied electrical current. When, during the operational flight of the solid propellant rocket motor, the flow of current is cut off the burning surface area of the solid propellant grain will quickly recede beyond the previously heated portion of the conductor, because the conductor is not heated over its entire length, but only that portion thereof that is near the burning surface of the solid propellant grain and no additional stimulation of the burning rate of the solid propellant grain will exist, except for the heat that is transmitted from the normal burning action of the solid propellant grain. When this condition occurs and continues to exist, the burning surface of the solid propellant grain and the pressure and thrust of the solid propellant rocket motor will then be in a "neutral" condition which will exist until the flow of the electrical current to the conductor is restarted, or until burnout of the solid propellant rocket motor.

The resistance heated conductor may be composed of any suitable metallic or non-metallic element that will produce the desired temperature profile and burn-off rates and the cross-section of such conductors may be circular, oval or similar configurations as may be necessary for manufacturing procedures or the required performance ratings of the solid propellant rocket motor.

Another type of conductor that is contemplated by the instant invention is an arc consumed conductor that will increase the pressure of the solid propellant rocket motor by causing the adjacent area of the solid propellant grain to recede at a higher rate than is created by the nominal burning surface of the solid propellant grain. Thus, as previously stated, conical depressions will be created in the burning surface area of the solid propellant grain as it burns away from the regressing conductors, thus the localized burning surface area of the solid propellant grain at each conductor is dependent upon the depth of the conical depressions. The pressure of the solid propellant rocket motor is, therefore, a function of the number of conductors utilized and their rate of regression. As has been previously stated, the increase of the pressure of the solid propellant rocket motor can be controlled or terminated by varying or terminating the flow of electrical current to the conductors. If the solid propellant rocket motor is not in the accelerated burning state, that is, electrical current is not being supplied to the conductors, the conductors will be burned off by the burning of the solid propellant grain as the burning surface area recedes.

Each of the arcing conductors will consist of a positive and a negative electrode which will be composed of any suitable metallic or nonmetallic elements that are constructed to meet the required electrical current used and the burn back rate of the solid propellant grain and these conductors will regulate the heat transmissions from the burning area of the solid propellant grain to the nonburning area thereof.

It is an object of this invention, therefore, to provide a pressure control system for solid propellant rocket motors that utilizes a conductor that provides a constant high temperature profile along a predetermined length of the conductor or utilizes positive and negative electrodes that create a heated area near the burning surface of a solid propellant grain or create an arc near the burning surface of a solid propellant grain to accelerate the burning of the solid propellant grain to increase the pressure and thrust of the solid propellant rocket motor.

It is another object of the invention to provide a pressure control system for solid propellant rocket motors that includes a power source and a control therefor that regulates the flow of the electrical current to the conductors to meet the requirements of the solid propellant rocket motor to carry out the operational environments as set forth in a programmed flight mission.

With the above and other objects and advantages in view, as well as those that may appear to one skilled in the art, it will be apparent that the invention consists of the novel arrangement of parts more fully hereinafter described, claimed and illustrated in the accompanying drawings in which:

BRIEF DESCRIPTION OF THE DRAWINGS

FIG. 4 is a detailed fragmentary sectional view showing another form of conductor for the invention;

FIG. 5 is a longitudinal sectional view showing another form of conductor than those illustrated in FIGS. 1 to 4 inclusive; and FIG. 6 is a cross-sectional view of the conductor of FIG. 5 on the line 6—6 thereof.

DESCRIPTION OF THE PREFERRED EMBODIMENTS

Figure 1:
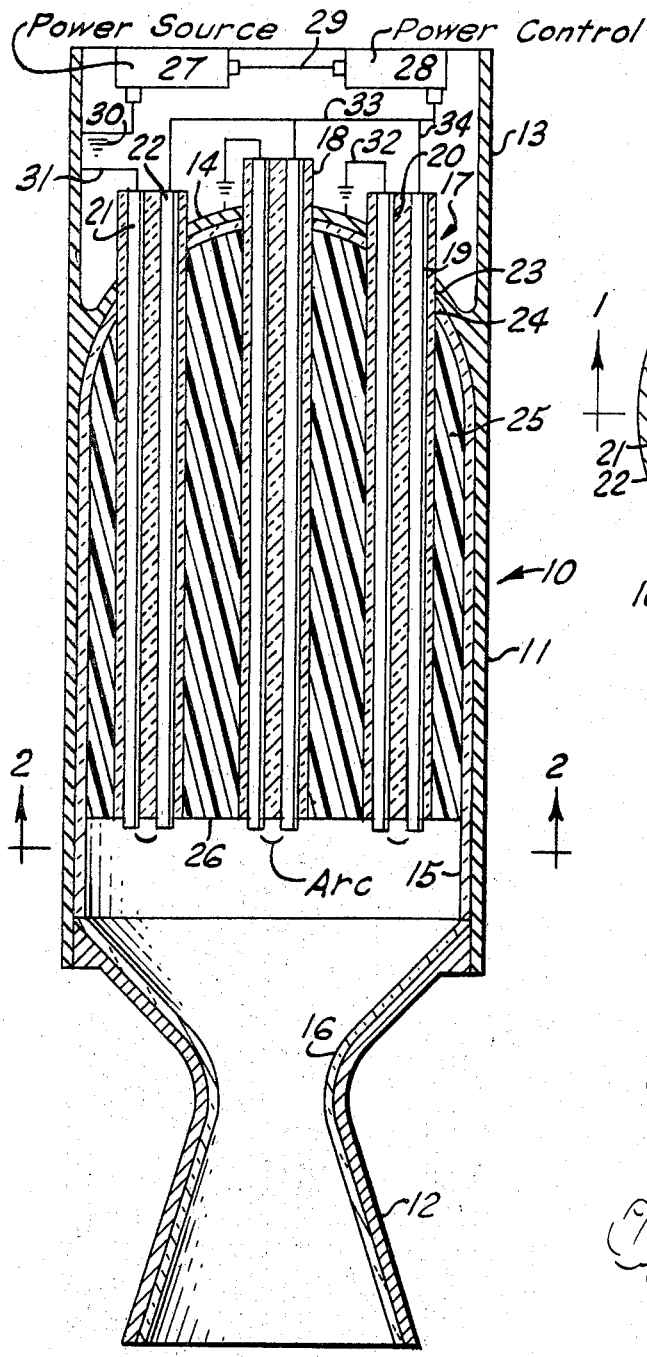
FIG. 1 is a longitudinal sectional view of a solid propellant rocket motor illustrating one form of the system embodying the invention as it is installed therein and is taken on the line 1—1 of FIG. 2.

Referring more in detail to the drawings, wherein like parts are designated by like reference numerals, the reference numeral 10 is used to generally designate a solid propellant rocket motor.

The solid propellant rocket motor 10 may be said to be of conventional design and includes a motor case 11 to which a nozzle 12 may be connected to the open aft end thereof in any well known manner.

At the forward or head end of the motor case 11 a circular skirt 13 is formed as a part of the motor case 11 and a domed head end 14 is also formed with the motor case inwardly of the outer end of the skirt 13.

Following the usual construction procedures, an insulation 15 covers the interior surface of the motor case 11 and head end 14 and extends therefrom to the open aft end of the motor case 11. There is also bonded to the interior surface of the nozzle 12 a suitable erosion resistant insulation 16.

Figure 2:
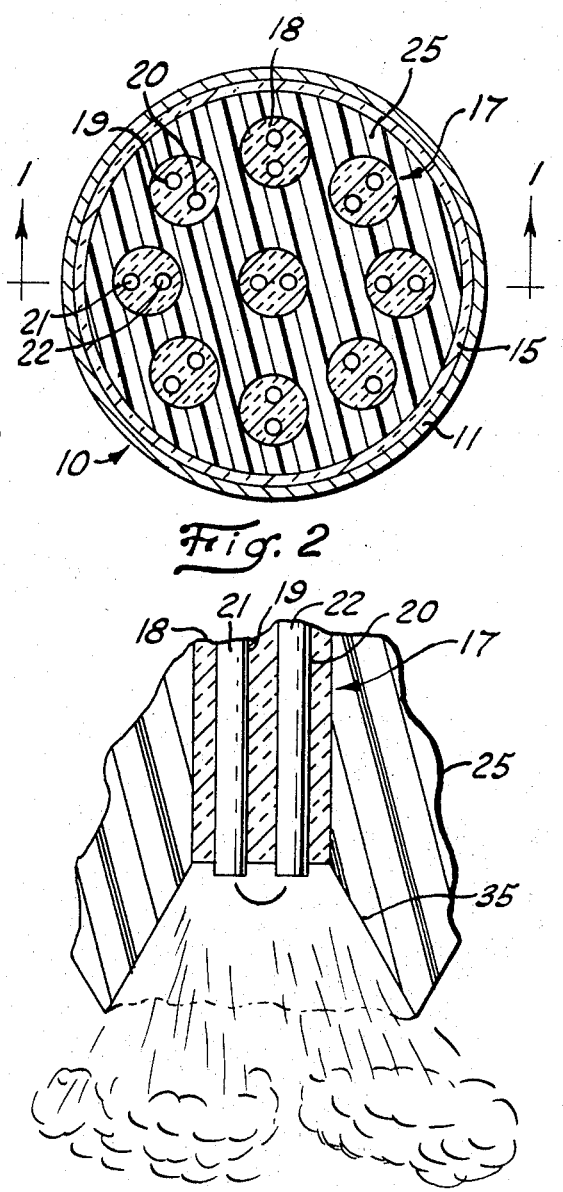
FIG. 2 is a cross-sectional view taken on the line 2—2 of FIG. 1.
Figure 3:
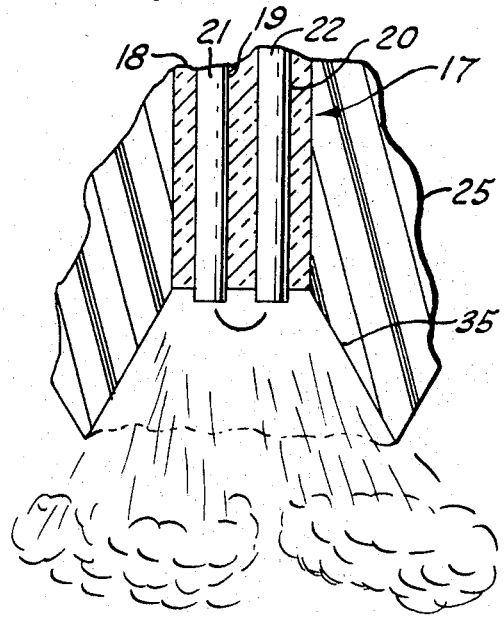
FIG. 3 is a detailed fragmentary sectional view showing the manner in which conical depressions are formed in the solid propellant grain during the operation of the system embodying the invention.

In FIGS. 1 to 3 inclusive, there is shown one form of conductor 17 that is utilized to carry out the invention.

The conductor 17 is preformed and consists of a cylindrical form of insulation 18 that has a pair of longitudinally extending parallel spaced bores 19 and 20 therein, in which are inserted a pair of electrodes 21 and 22, as shown in the figures, it being understood that there is an electrode in each of the bores. As previously stated, other configurations such as oval etc. may be used to replace the cylindrical form of the conductor 17.

In positioning the system embodying the invention in the solid propellant rocket motor 10, equally spaced openings 23 are provided in the head end 14 and aligned openings 24 are also provided in the insulation 15 to receive the conductors 17, as shown in FIG. 1. Positioning means are used at the open aft end of the motor case 11 and then a solid propellant grain 25 is cast into the motor case 11 and the conductors 17 are then encompassed by and become embedded in the solid propellant grain 25 as also shown in FIG. 1.

As shown in FIG. 1, the forward ends of the conductors 17 extend slightly beyond the head end 14 and the aft ends of the insulation 18 terminate in a plane contiguous with the burning surface 26 of the solid propellant grain 25. The aft ends of the electrodes 21 and 22, however, extend beyond the extremity of the insulation 18 so that an "arc" can be created as shown in FIG. 1, when an electrical current is supplied to the electrodes 17 as will be later described.

Electric current is supplied to the conductors 17 by means of an electrical power source 27 that is mounted within the skirt 13 and the power source 27 is connected to a power control 28 also mounted within the skirt 13 for controlling the input of electrical current to the electrodes 17 by a lead 29, or may be mounted at any other convenient location on the airframe of the solid propellant rocket motor. The power source 27 is grounded to the skirt 13 at 30 and electrodes 21, which become the negative electrodes, are grounded either to the skirt 13 as at 31 or to the head end 14 as at 32. The electrodes 22 are the positive electrodes, because they are connected to the power control 28 by a universal lead 33 and individual leads 34. The power control 28 is actuated by a suitable guidance system which may be any well-known construction, as is used in such guidance systems.

It has been previously stated that conical depressions are created about the electrodes 21 and 22 in the solid propellant grain 25 by the arcing of these electrodes and FIG. 3 is used to illustrate the manner in which such conical depressions 35 are created as the electrical current is supplied to the electrodes 21 and 22 by means of the electrical power source 27.

During operational flight of a solid propellant rocket motor, in which the system embodying the invention has been installed, the power control can be actuated by the guidance system to direct the flow of electrical current to the electrodes 21 and 22 and the burning surface 26 of the solid propellant grain 25 can be increased as desired. As current is supplied to the electrodes, as previously described, the electrodes will arc as shown in the drawings and the burning rate of the solid propellant will be accordingly increased. The conical depressions 35 will be formed, as shown in FIG. 3, and the pressure and thrust of the solid propellant rocket motor will accordingly be increased.

As long as the ends of the electrodes at the burning surface 26 remain within the confines of the solid propellant, they will not be damaged by the burning of the solid propellant, but as the burning surface 26 regresses, the insulation 18 and the electrodes 21 and 22 will be consumed but not to the point where the arcing across the electrodes 21 and 22 is eliminated.

In FIG. 4 a fragment of a solid propellant grain 36 is shown, it being similar to the solid propellant grain 25, but a new form of conductor 37 is shown, this form also includes a cylindrical form of insulation 38 having longitudinally extending bores 39 and 40 in which are positioned electrodes 41 and 42.

In this form of the invention, both the aft end of the insulation, as well as the aft ends of the electrodes 41 and 42, terminate at or near the burning surface 43 of the solid propellant grain 36.

No arcing occurs in this form of the invention, but the insulation is of the type that will conduct an electrical current as the temperature of the insulation is raised, thus creating a zone of electrical resistance that permits heating of the conductor at or near the burning surface of the solid propellant grain. Or the insulation may be chosen to provide an electrical path at high temperature that completes the circuit between electrodes 41 and 42 and permits heating of the electrodes 41 and 42.

The solid propellant grain 36, that is in contact with the insulation 38, is heated to a higher temperature than that area of the solid propellant grain 36 that is not adjacent to the conductor 37 and the localized heating of the solid propellant grain 36 will also increase the burning rate of the solid propellant grain 36, but not to the extent that the burning rate is increased by the arcing of the electrodes 21 and 22, as previously described. Otherwise, this form of the invention will operate in the same manner as the form of the invention shown and described for FIGS. 1 to 3 inclusive.

In FIGS. 5 and 6, another form of conductor 44 is shown and this form comprises a metallic tubular sheath or sleeve 45 in which is positioned a cylindrical form of insulation 46 having a longitudinally extending bore 47 in which is positioned an electrode 48 that is made of graphite or any similar conductive material.

In this form of conductor the aft end of the insulation 46 may be recessed inwardly of the extreme aft ends of the sheath or sleeve 45 and the electrode 48 to create arcing of the electrode 48 and sheath 45 or the ends of the sheath 45, insulation 46 and electrode 48 can be contiguous and the insulation 46 can be of the form that permits heating without arcing. Otherwise, this conductor operates in the same manner as does the conductors 17 and 37.

There has thus been provided a control system that will regulate the pressure and thrust of a solid propellant rocket motor and it is believed that the mode of operation and the construction of the invention will be apparent to one skilled in the art from the foregoing description, it also being understood that any variations in the mode of operation and construction of the invention may be adhered to provided such variations fall within the spirit of the invention and the scope of the appended claims.

Having thus described the invention what is claimed as new and desired to be secured by Letters Patent is:

1. In a pressure controlled system for solid propellant rocket motors, including a rocket motor case, having a head end, a skirt portion and a solid propellant grain having a burning surface in said motor case, the improvement comprising a plurality of conductor bodies positioned in the solid propellant grain in spaced parallel longitudinally extending relation to each other and to the longitudinal axis of said motor case and extending to said burning surface, means for supplying an electric current to said conductor bodies and means connected to said supply means to control the input of the electrical current to said conductor bodies for varying the burn rate of said propellant at said burning surface and thus the pressure generated in said solid propellant rocket motor.

2. In a pressure controlled system as in claim 1, wherein each of said conductor bodies is formed from an insulating material that is provided with a pair of relatively spaced bores therein and an electrode is positioned in each of said bores.

3. A pressure controlled system as in claim 1, wherein the means for supplying the electrical current to said conductor bodies comprises an electrical power source that is mounted on said solid propellant rocket motor.

4. A pressure controlled system as in claim 1, wherein the means for controlling the input of the electrical current to said conductor bodies comprises a power control unit and said unit is connected to said first means and is also mounted on said solid propellant rocket motor.

5. A pressure controlled system as in claim 1, wherein each of said conductor bodies have the forward ends thereof extended through said head end and the aft ends thereof terminating adjacent the burning surface of said solid propellant grain.

6. A pressure controlled system as in claim 2, wherein the aft ends of said electrodes extend beyond the burning surface of said solid propellant grain to permit an arc to bridge the ends of said electrodes when the electric current is supplied thereto.

7. A pressure controlled system as in claim 2, wherein said electrodes create a resistance heat source for the solid propellant grain when the electric current is supplied thereto.

8. A pressure controlled system as in claim 5, wherein said head end is provided with a plurality of relatively spaced openings therein for the extension therethrough of the forward ends of said conductor bodies.

9. A pressure controlled system as in claim 1, wherein said conductor bodies are positioned in said motor case and the solid propellant grain is cast into said motor case to embed said conductor bodies in said solid propellant grain.

References Cited

UNITED STATES PATENTS

| | | | |
|---|---|---|---|
| 3,143,853 | 8/1964 | Sobey | 60—254 |
| 3,362,158 | 1/1968 | Thurston et al. | 60—39.82 XR |

CARLTON R. CROYLE, Primary Examiner

U.S. Cl. X.R.

60—39.47